July 27, 1937.  C. W. ALLEN  2,087,958
STRUCTURAL UNIT
Filed Feb. 6, 1932   2 Sheets-Sheet 1
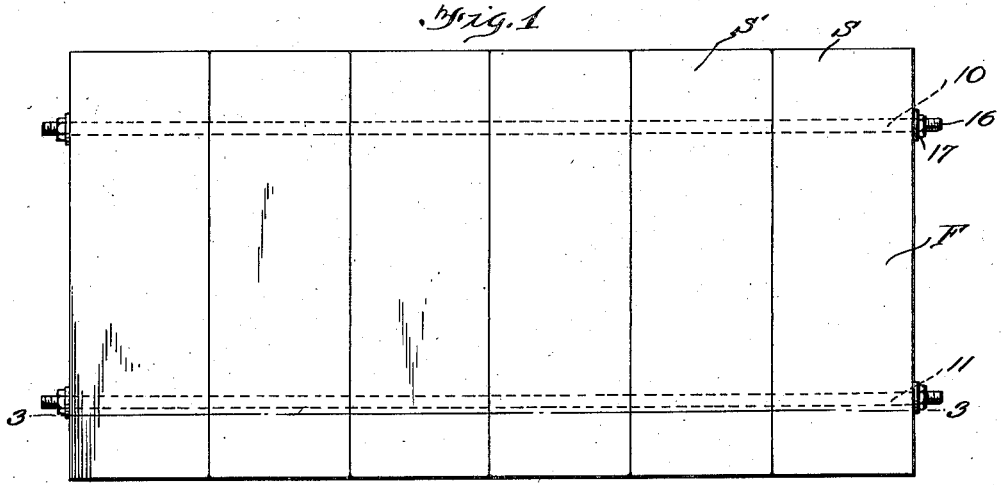
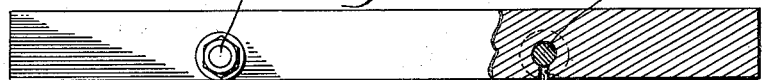
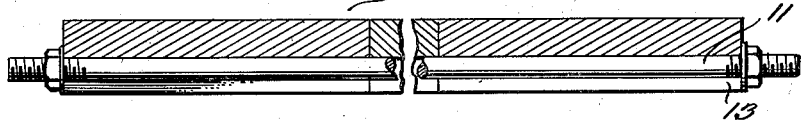
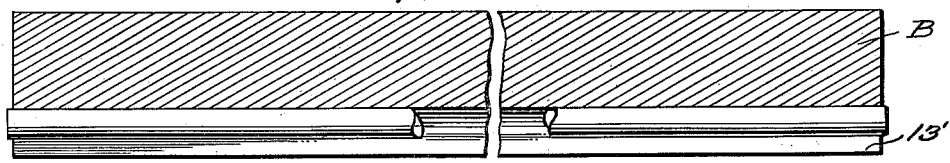
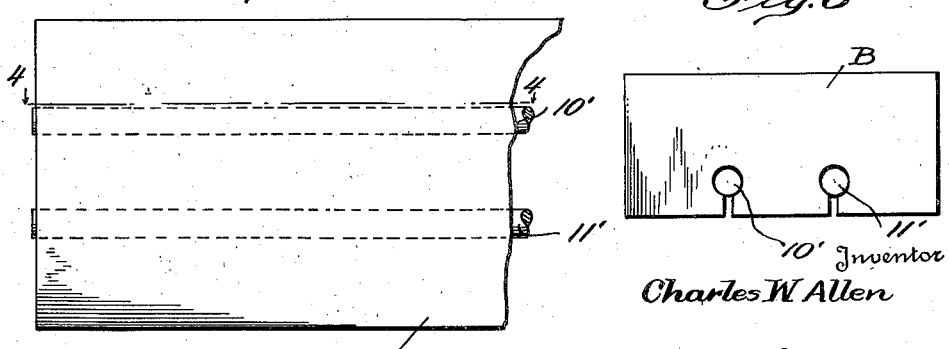
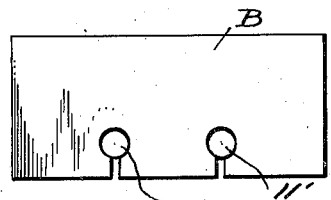
Inventor
Charles W. Allen
By John W. Farley
Attorney July 27, 1937.  C. W. ALLEN  2,087,958
STRUCTURAL UNIT
Filed Feb. 6, 1932  2 Sheets-Sheet 2
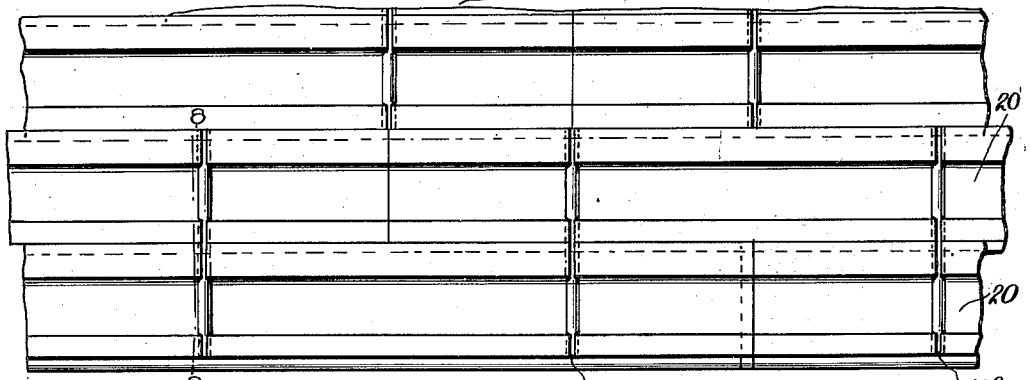
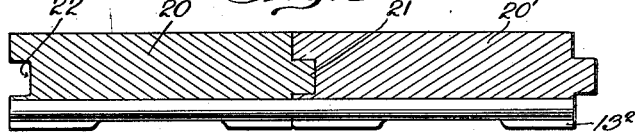
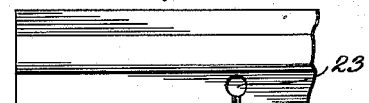
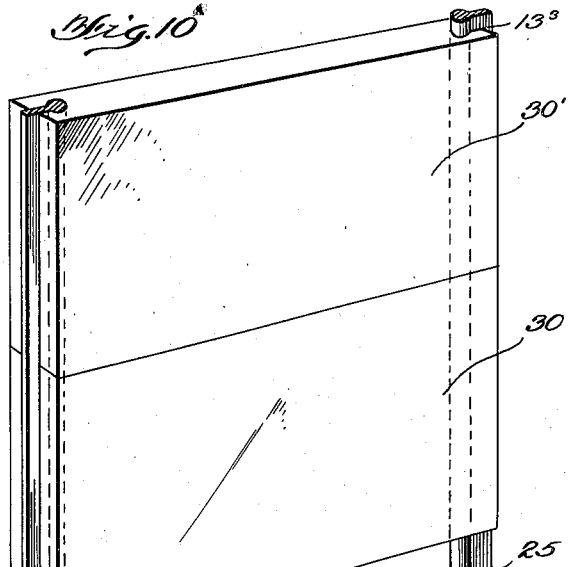
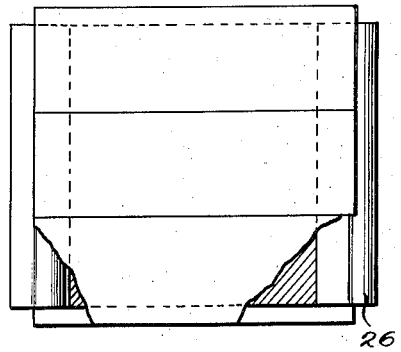
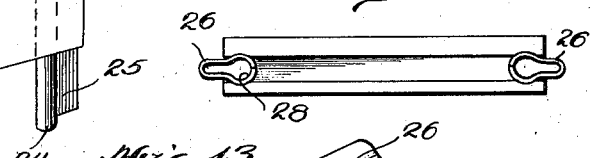
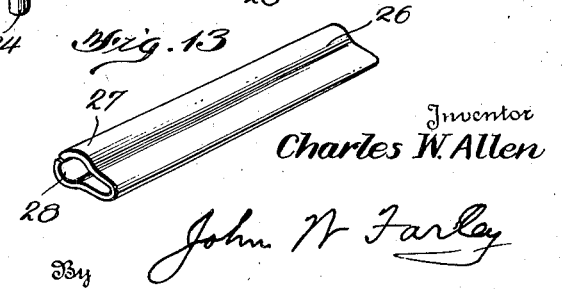
Inventor
Charles W. Allen
By John N Farley
Attorney Patented July 27, 1937

2,087,958

UNITED STATES PATENT OFFICE 2,087,958

STRUCTURAL UNIT

Charles W. Allen, Memphis, Tenn.

Application February 6, 1932, Serial No. 591,292

15 Claims. (Cl. 20—92)

The present invention relates to a wood construction particularly adapted for advantageously utilizing waste or inferior woods to produce a variety of useful products.

More specifically an object is to devise means for reinforcing and tying strips of wood together to form among others a construction capable for use in reinforcing or trussing timbers such as joists, beams, girders and the like and also joining a number of strips of wood to form structures capable of use as floor and running boards for automobiles, counters, table tops, picket fences and packing crates.

Another aim is to provide a construction of the character indicated which will permit the expansion and contraction of wood due to the moisture from any source absorbed by the wood cells, without buckling and warping.

In its more detailed aspects, the invention comprises means for reinforcing beams and for tying strips of wood together, the beams and strips being preferably formed with combined slots and bores of the keyhole type, in combination with splines of substantially circular cross section of non-moisture absorbing material, insertable in the bores.

Other objects and advantages will be apparent from the detailed description hereinafter appearing, taken in conjunction with the attached drawings forming part thereof and in which Fig. 1 is a top plan view showing a plurality of strips of wood joined together by means of flexible splines and adapted for use as floor boards and the like;

Fig. 2 is an enlarged end view, partly broken away, of the structure of Fig. 1;

Fig. 3 is a broken sectional view taken on line 3—3 of Fig. 1;

Fig. 4 is a broken sectional view of a modification taken on line 4—4 of Fig. 5 and showing the manner of reinforcing the under edge of a wooden beam, girder or joist and the like;

Fig. 5 is a broken top plan view of the form of the invention shown in Fig. 4;

Fig. 6 is an end view on a somewhat reduced scale of the structure shown in Figs. 4 and 5;

Fig. 7 is a bottom plan view of a still further modification of the invention showing means for consolidating any number of strips (usually short and narrow strips) into a surface or plane of the desired length and width;

Fig. 8 is a sectional view taken on line 8—8 of Fig. 7;

Fig. 9 is a fragmentary side view of the form of the invention of Figs. 7 and 8;

Fig. 10 is a perspective view of a still further modified form of the invention showing the use of the combined spline and tongue for uniting strips of wood at their edges;

Fig. 11 is a broken plan view of another modification showing the use of a different type of spline and tongue;

Fig. 12 is an end view of the form shown in Fig. 11;

Fig. 13 is a perspective view of the spline and tongue of Figs. 11 and 12.

One of the great problems which prohibits the use of wood in forming various structural units is expansion and contraction due to the moisture from any source which is absorbed in the cells of the wood. Various attempts have been made to meet this undesirable condition as by using wood preservatives and the like. However, this is a costly process which, in many instances, precludes its use. Further, it has been found that, for instance, in the laying of a floor, one of the most expensive operations is the time consumed by the carpenter in the separate handling of each piece of wood as, for example, in putting a tongue and groove flooring together so that the pieces will fit tight and followed by nailing the pieces down. According to my invention the above mentioned costs are materially reduced in a simple and efficacious manner.

In its broadest aspect my invention comprises reinforcing and/or uniting strips of wood having bores and slots of keyhole formation, preferably by means of metal splines inserted endwise into the bores. The arrangement is such that the individual strips may slide on the spline when expanded by the action of moisture and this phenomenon precludes warping which would ordinarily occur. Furthermore, the formation of the bores and communicating slots which extend through one side or face of the strips of wood prevents curling or wraping of the strips.

Referring to the drawings and first to the modification of Figs. 1, 2, and 3, there is shown a floorboard or the like F comprising a plurality of wooden strips S, S', etc. secured together edge to edge by means of a pair of flexible splines 10, 11. Each strip is formed with a pair of parallelly disposed combined bores and slots 13 of substantially keyhole formation running crosswise thereof and formed from its bottom surface to extend therebeneath. This type of bore and slot is readily formed by feeding the strip or the timber through a machine with special cutters or bits properly set or adjusted to machine or cut the required keyhole shaped grooves and by having the slot and bore communicating with the surface, the chance of splitting the wood during its formation is practically eliminated. Receivable in the bores are the pair of metallic splines 10, 11, this being accomplished by inserting the end of each spline into the bore and gently forcing the spline therethrough. The diameter of each spline is slightly less than that of the bore but materially greater than the slot, that is, the distance between the sides 14 and 15 defining the slot, whereby the spline is held in place. Each of the splines in addition may have, if desired, a threaded end 15 for receiving nuts 16 and 17 whereby the bored strips may be removably held in position.

In Figs. 4, 5, and 6 there is shown a wooden bar beam, girdle or joist B of substantial thickness or depth also formed with, but lengthwise and through the under edge or face thereof, with keyhole bores and slots 13' having splines 10', 11' inserted therethrough as in the form of the invention already described. The bar beam, girder or joist may be of a poor grade of lumber, full of knots, but when reinforced as described, will be well adapted for use as a beam or joist. In other words, where an inferior grade of wood could heretofore not be used because of weak wood fibres, yet according to my invention the same fibres are well adapted to support small flexible rods that would sag of their own weight if used separately and independently of the wood. Or, otherwise stated, the combination of flexible rods and wood, increases the strength of the wood in addition to amplifying the utility of the iron rods or splines.

The form of the invention shown in Figs. 7, 8, and 9 is applicable for uniting wood strips such as used in flooring. Each strip 20 is provided with a tongue 21 and groove 22 for assembly and interfitting relationship with a similar strip 20'. A plurality of keyhole bores and slots 13² are formed cross-wise of the strips 20, 20' for the reception of splines 23 for holding the strips in united position. It will be appreciated that the splines 23 may be of a length sufficient to unite more than two strips, if desired. With this arrangement, it will be noted that the splines are inserted endwise through the bores and the whole flooring may be assembled in sections of the required lengths and widths at the factory whereby a most speedy, desirable and economical installation may be effected. The saving in the cost of labor over the method of laying the strips individually will be apparent. Also, if desired, plastic material, such as so-called "plastic wood" etc. may be inserted in the slots and/or bores so as to fill the slots between the bores and the plane of the unit after or before insertion of the splines. This would be useful in finishing panel work, flooring and beams. The strips, as shown in Fig. 7, will be located so as to break joints in the usual manner, this being of importance mainly where short, narrow strips are being made into structural units of relatively large size, and the transverse keyhole slots should be so located as to miss the joints between abutting ends of alined strips.

The modification of Fig. 10 differs from the forms heretofore described in that the strips 30, 30' have the keyhole bore and slots 13³ formed at their ends or alined edges and in that the splines 24 have a tongue or projection 25 to lie in the grooves in the side edges of adjacent member units.

The form of Figs. 11, 12, and 13 is similar to that of Fig. 10, but is distinguishable therefrom in the character of the splines 26. As shown, these are of splint tubular formation, bent from a single blank of sheet material, and held in position in the bores by the resiliency of its adjacent sections 27, 28.

In my prior Patent 1,796,880, referred to above, the splines were inserted into the grooves formed in the surface of the boards by pressure and so held the boards in rigid position. Accordingly, it will be seen that such an arrangement defeats one of the primary objects contemplated by the present invention, namely, an arrangement which will permit the wood to move relative to the splines when subjected to the action of moisture laden air. Furthermore, no special machine is required in the instant application to insert the splines in the grooves as in my prior patent.

Other advantages than those specifically enumerated will be apparent to those skilled in the art to which this invention appertains, and it is my intention to cover all modifications thereof and to be limited in this respect only as may be necessary by the scope of the claims hereto appended.

I claim:

1. A structural unit comprising a strip of wood formed with a slot of keyhole shape, the neck of the slot intersecting a surface of the strip, and a spline extending lengthwise of the bore of the slot, said spline having at least a portion thereof of materially greater width than the distance between the walls defining the neck of the slot.

2. A structural unit as in claim 1, said spline being of non-moisture-absorbent material.

3. A structural unit comprising a strip of wood formed with a slot of keyhole shape, the neck of the slot intersecting a surface of the strip, and a readily insertable metallic spline extending lengthwise of the bore of the slot, said spline having at least a portion thereof of materially greater width than the width of said neck.

4. A structural unit comprising parallel strips of wood said unit having a slot continuously extending through successive strips at a surface thereof and also having a bore at a distance from said surface but continuously opening into said slot, in combination with a spline having a thickness greater than the width of the slot but so proportioned as to be freely insertable into said bore.

5. A structural unit comprising contacting pieces of wood formed transversely thereof with one or more keyhole slots whose necks intersect an adjacent face of the unit, and readily insertable splines in the bores of the slots uniting said pieces, said splines being materially greater in width than the necks of said keyhole slots.

6. A device as in claim 5, said splines being made of material impervious to moisture.

7. A device as in claim 5, said splines being made of metal.

8. A structural unit comprising strips of wood having alined keyhole-shaped slots whose necks intersect an edge of the unit, and a spline in the bores of said slots, said spline being wider than the necks of the slots and serving to unite the strips.

9. A device as in claim 8, the spline being impervious to moisture.

10. A device as in claim 8, the spline having a tongue projecting from the unit for engagement in a slot of an adjacent unit.

11. A device as in claim 8, the spline being a resilient compressible, hollow, metallic member.

12. A device as in claim 8, the spline being a resilient, compressible hollow metallic member with a tongue protruding through the neck of the slot for engagement in a slot of an adjacent unit.

13. A structural unit comprising a beam or the like with one or more keyhole-shaped slots extending lengthwise thereof, the neck of each slot intersecting a surface of the beam, and readily insertable splines in the bores of the slots, the width of the splines being less than that of the neck of the corresponding slot.

14. A device as in claim 13, the splines consisting of material not expansible by moisture.

15. A device as in claim 13, the splines being made of metal.

CHARLES W. ALLEN.